No. 733,395. PATENTED JULY 14, 1903.
F. C. HUTCHINSON.
AUTOMATIC VENDING MACHINE.
APPLICATION FILED JAN. 12, 1903.
NO MODEL. 5 SHEETS—SHEET 3.

WITNESSES: INVENTOR:
Frank C. Hutchinson,
BY
Edmond Conger Brown
ATTORNEY

No. 733,395. PATENTED JULY 14, 1903.
F. C. HUTCHINSON.
AUTOMATIC VENDING MACHINE.
APPLICATION FILED JAN. 12, 1903.
NO MODEL. 5 SHEETS—SHEET 4.

WITNESSES:
A. R. Appleman
Wm. N. MacLean

INVENTOR:
Frank C. Hutchinson
BY
Edmond Conyers Brown
ATTORNEY

THE NORRIS PETERS CO., PHOTO-LITHO., WASHINGTON, D. C.

No. 733,395. PATENTED JULY 14, 1903.
F. C. HUTCHINSON.
AUTOMATIC VENDING MACHINE.
APPLICATION FILED JAN. 12, 1903.
NO MODEL. 5 SHEETS—SHEET 5.
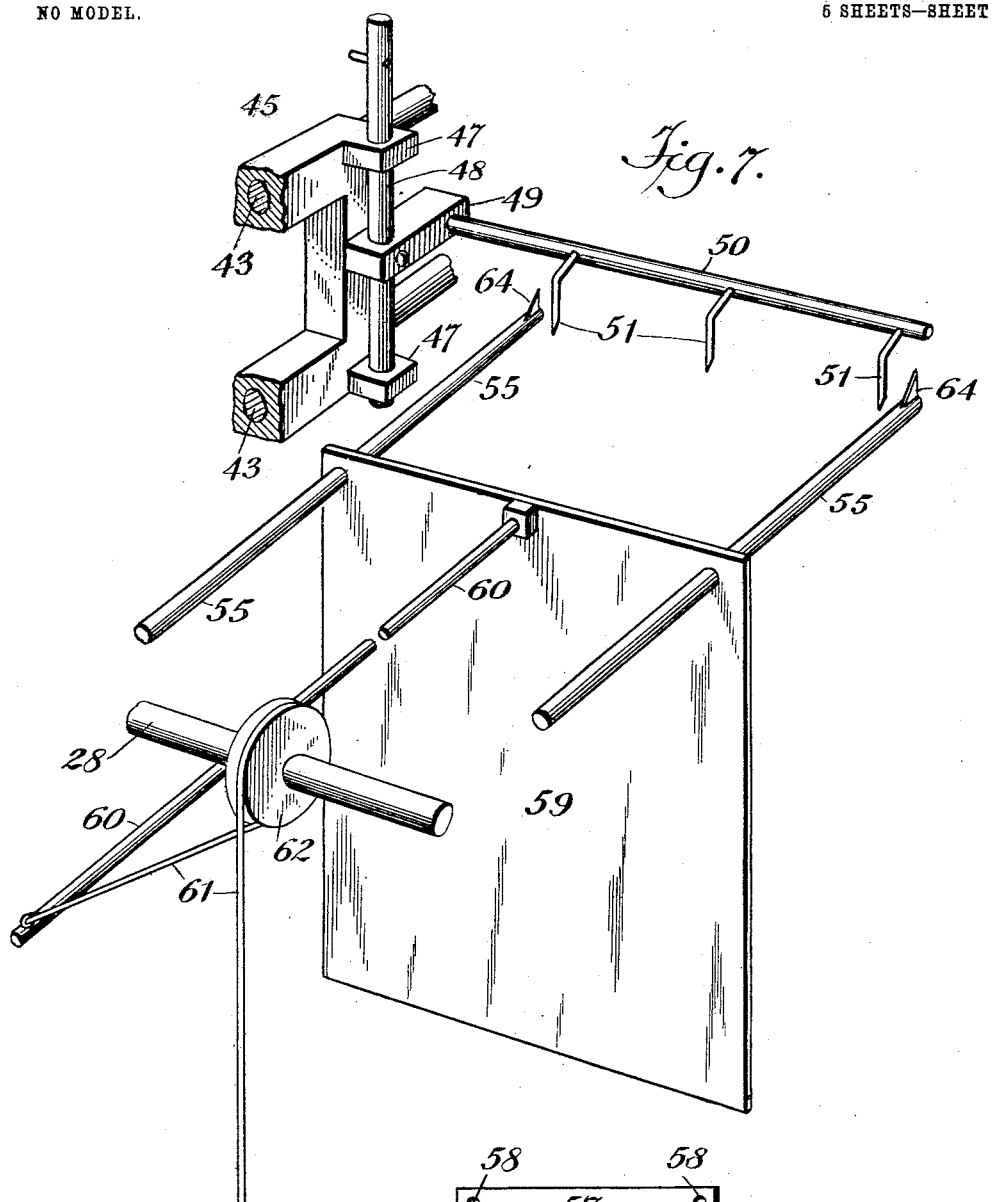
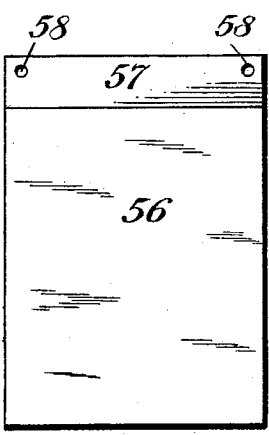
WITNESSES:
INVENTOR:
Frank C. Hutchinson
BY
Edmond Congar Brown
ATTORNEY No. 733,395.

Patented July 14, 1903.

UNITED STATES PATENT OFFICE.

FRANK C. HUTCHINSON, OF NEW YORK, N. Y.

AUTOMATIC VENDING-MACHINE.

SPECIFICATION forming part of Letters Patent No. 733,395, dated July 14, 1903.

Application filed January 12, 1903. Serial No. 138,608. (No model.)

*To all whom it may concern:*

Be it known that I, FRANK C. HUTCHINSON, a citizen of the United States, and a resident of the borough of Brooklyn, county of Kings, city and State of New York, have invented certain new and useful Improvements in Automatic Vending-Machines, of which the following is a specification.

My invention relates to that class of devices which contain a supply of a vendible commodity—as, for instance, peanuts—a certain predetermined quantity of which is measured out and ejected from the machine at each operation thereof. Such machines are usually either operated or freed for operation by coin-controlled mechanism. Any suitable form of such mechanism may be used in connection with my invention; but I do not show or describe any particular form thereof in this application.

The invention consists in the novel construction, arrangement, and combination of various devices and parts, as hereinafter and in the accompanying drawings fully and at large set forth.

Figure 1:
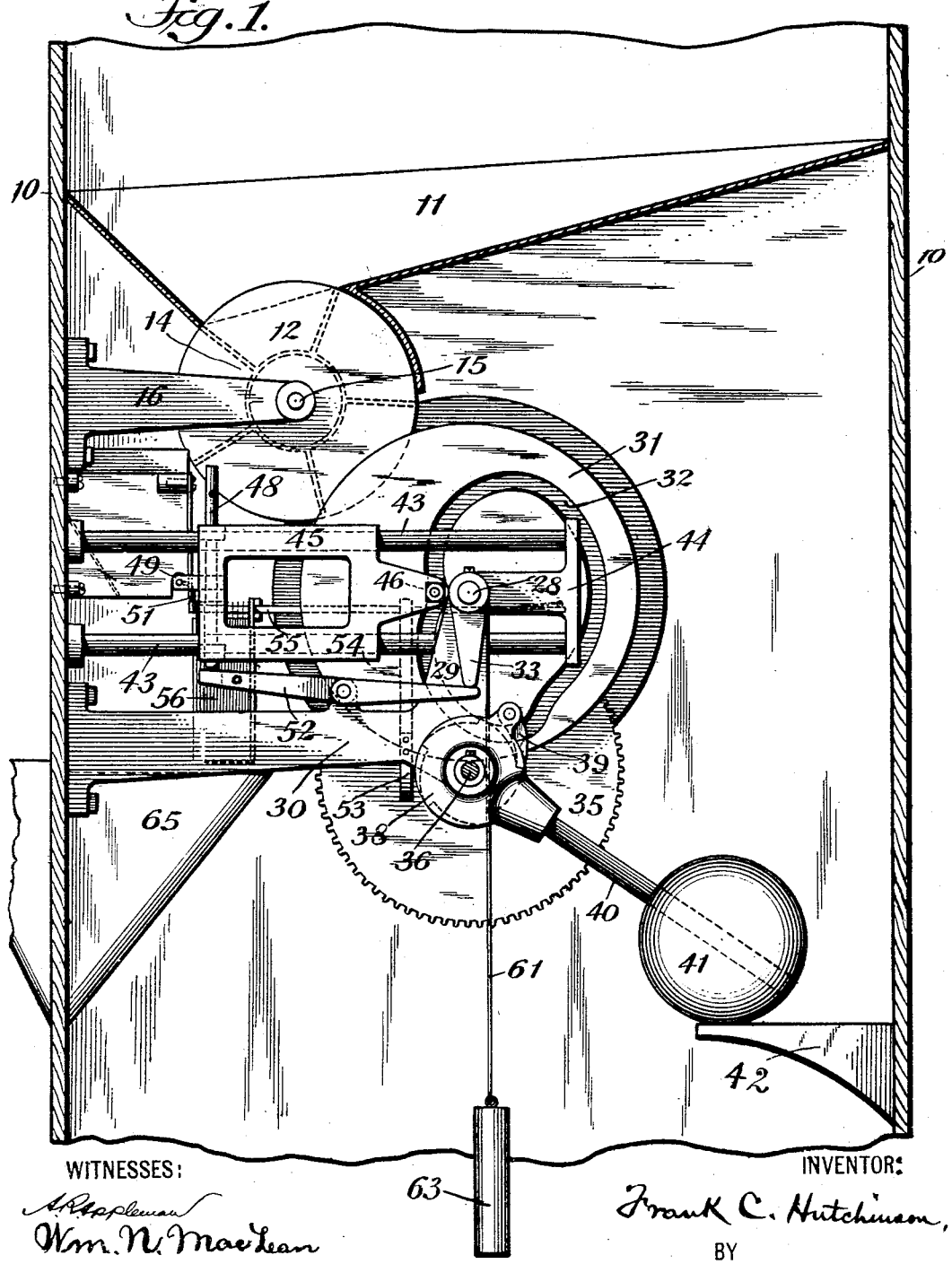
Figure 2:
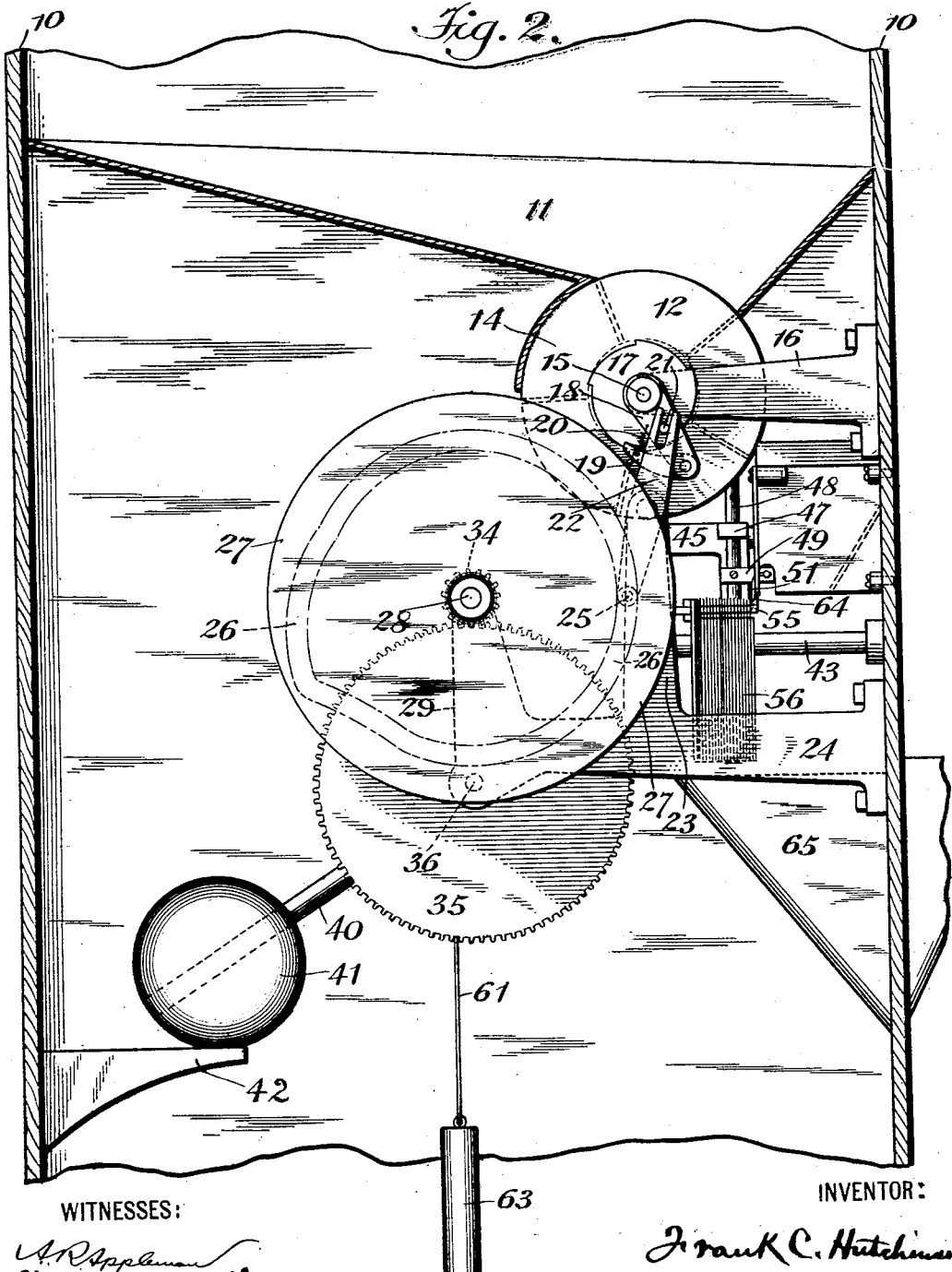
Figure 3:
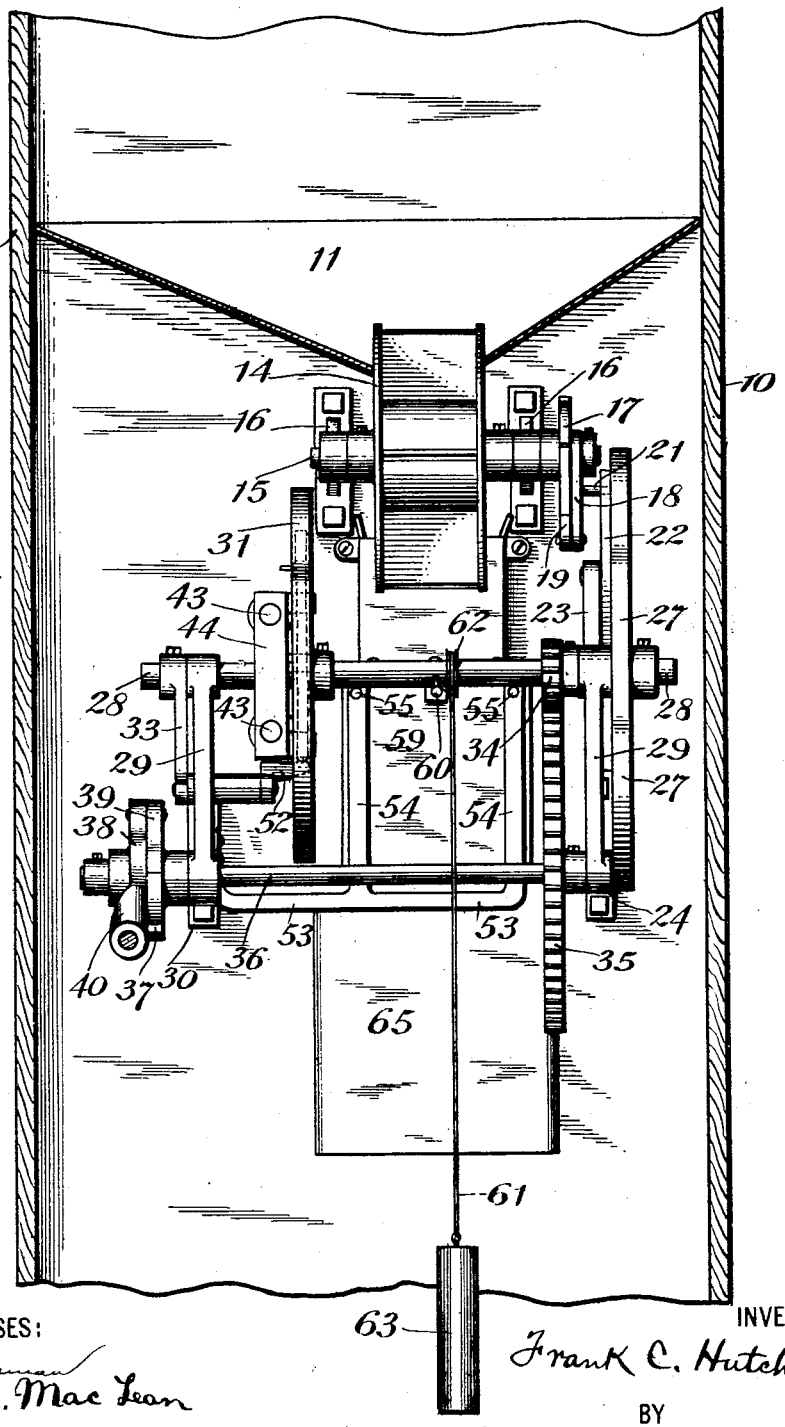
Figure 4:
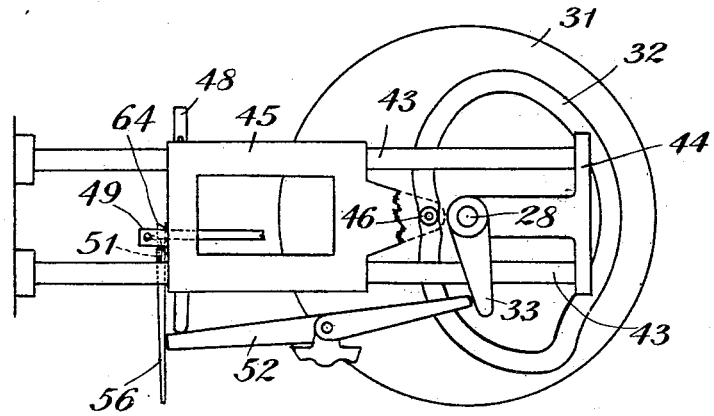
Figure 5:
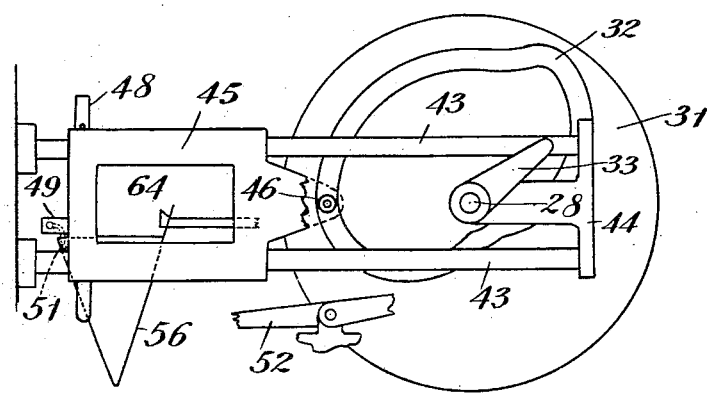
Figure 6:
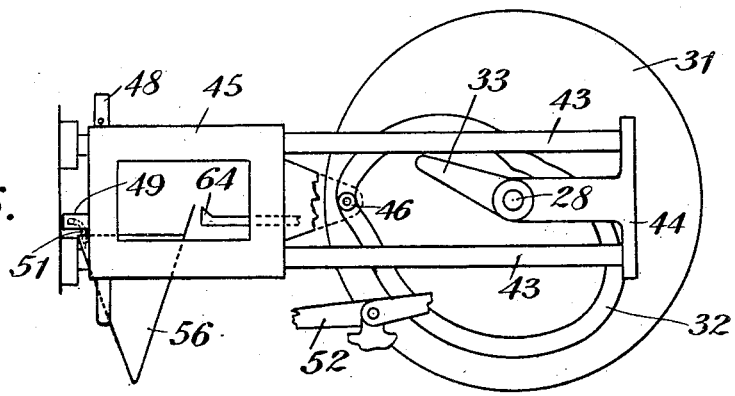

In the accompanying drawings, Figure 1 is a side elevation of my invention, the side of the casing being removed. Fig. 2 is a similar view, but from the other side of the machine. Fig. 3 is a rear view. Figs. 4, 5, and 6 are diagrammatic views showing the mode of operation of certain of the parts. Fig. 7 is an enlarged view of certain details of the bag holding and opening devices, and Fig. 8 is a view of the special form of bag which is used in the machine for receiving the peanuts or other commodity to be vended.

In carrying my invention into effect I provide a suitable containing-case 10, to the upper part of the front of which are secured the working parts of the machine. This case is preferably of such a length that when the bottom rests upon the ground the machine in the upper part is elevated to a convenient height for operation. In the extreme upper part of the case above the moving parts of the machine is secured a hopper 11 for holding the peanuts, having an opening 12, through which they pass down into the measuring-wheel 14, which is divided into a number of compartments, as shown in the drawings, one of which when the machine is stationary always registers exactly with the opening in the hopper 11. The axis 15 of this wheel 14 is journaled in brackets 16, which are secured to the front of the casing.

On one side of the measuring-wheel 14, rigidly secured to the axle 15, is a ratchet-wheel 17, (see Figs. 2 and 3,) and hanging from said shaft loose thereon is an arm 18, having pivotally secured thereto a pawl 19, which engages with the ratchet-wheel 17, a spring 20 keeping it in contact therewith. On the arm 18 is a stud 21, with which engages the slotted end of a lever 22, pivotally secured to an arm 23, which projects upwardly from the bracket 24, which is secured to the front of the casing. The other end of the lever 22 bears a roller 25, which engages with the slot 26 in the cam 27, which cam is borne on the shaft 28, which is journaled in arms 29, which project upwardly from the brackets 24 and 30. On the other end of the shaft 28 is a cam-wheel 31, having a groove 32, and on the extreme end, outside of the support, is an arm 33, rigidly attached to and moving with said shaft. The said shaft also bears a gear-wheel 34, adjacent to the other support, which gears with a wheel 35 on the shaft 36, journaled in the brackets 24 and 30. This shaft has near one end, outside the support, a rigidly-secured ratchet-wheel 37 and a loose wheel or disk 38, having a pawl 39 engaging with said ratchet-wheel. Attached to the disk 38 is a lever 40, having a weight 41 at its outer end, adapted to cause said lever to descend after it has been raised. The said weight rests when at its lowest point upon the shelf or support 42.

Attached to the front wall of the casing are two rods 43, which extend rearwardly and are supported and connected at their rear ends by the part 44, which is an extension of the bracket 30. Sliding upon these rods is a device 45, the rear end of which is provided with a roller 46, which engages with the groove 32 of the cam-wheel 31. At the front end of the device 45, sliding in perforations in lugs 47, (see Fig. 7,) is a vertical rod 48, bearing a horizontal piece 49, from which extends laterally a rod 50, provided with fingers 51. The rod 48 is supported by one end of a lever 52, pivotally supported in a lug of the bracket 30, the other end of which lever is controlled by the arm 33.

Attached to the bracket 30 and projecting laterally threfrom is a bracket 53, having two upward projections 54, (see Fig. 3,) which support forwardly-projecting rods 55. These rods form the supports for the bags into which the peanuts are deposited by the measuring-wheel. The bags are shown in Fig. 8, being designated 56, and, as will be there seen, have one side 57 higher than the other and provided with perforations 58, through which the rods 55 pass. Upon the rods 55 slides a plate 59 behind the bags, said plate being provided with a rod 60, (see Fig. 7,) extending toward the rear of the machine. To the end of this rod is attached a cord 61, which passes over a pulley 62 on the shaft 28, and to the other end of said cord is secured a weight 63, which tends to keep the plate 59 always pressed forward against the bags. The forward ends of the rods 55 are provided with knives 64, (see Fig. 7,) adapted to sever the upper margin of the bags and free them from the rods 55 when said bags are drawn strongly enough against said knives. Below the bags is a delivery-slide 65, into which the filled bags drop when freed from the rods 55, and by which they are conveyed to a point outside the case convenient to be secured by the purchaser.

In practice the machine will be provided with a lever or other operating means extending through the casing to the outside of the machine and operatively connected to some portion of the moving parts above described, preferably to the shaft 36, by any suitable form of coin-controlled mechanism, so that when the proper coin is introduced into such mechanism it will be possible, by means of such auxiliary lever, to raise the lever 40 and its weight 41, which weight is then allowed to fall, operating the machine; but as any suitable form of coin-controlled mechanism may be employed and as such mechanism is well known I do not here describe or show the same.

The operation of my invention is as follows: The hopper at the upper part of the machine being filled with peanuts or other commodity to be vended, the measuring-wheel being in the position shown in the drawings, one of its compartments registering exactly with the opening in said hopper, the said compartment is of course also filled and the machine is ready to commence operation. If, then, the outer end of the lever 40 is raised by any suitable means and then set free, the weight 41 causes it to again descend, and in doing so the disk 38 and pawl 39 engage with the ratchet-wheel 37 and turn the same a portion of a revolution corresponding to the distance between two teeth thereon. This motion is communicated by means of the shaft 36 to the gear-wheel 35, which operates the gear-wheel 34 and the cam-wheel 27, which operates, through the lever 22 and the ratchet-wheel 17 and the intermediate operative parts, the measuring-wheel 12, causing the same to partly revolve and to discharge a measured quantity of peanuts into the bag which is suspended below and which has meanwhile been opened and is being held open to receive same. The bags are strung upon the rods 55, the said rods passing through the perforations 58 in one side of the bags, Fig. 8, and they are always pressed forward by the disk 59, operated by the weight 63. They are opened by means of the fingers 51, which are operated by the vertically-sliding rod 48, Fig. 7, which is alternately raised and allowed to fall by the lever 52, Fig. 1, and are borne forward, after falling and entering the mouth of the bag, by the sliding piece 45, thus opening the bag. This operation is clearly shown in a diagrammatic way in Figs. 4, 5, and 6. The sliding piece is controlled by the cam-wheel 31. After the bag has been opened and the peanuts dropped into it the weight of the same usually in practice tears the bag away from the supporting-rods; but should same fail to be so disengaged the continued forward motion of the slide 45 and fingers 51 forces the bag against the knives 64, which sever the paper and free the bag, which then drops into the delivery-slide 65 and becomes accessible to the purchaser.

The measuring-wheel 12 may of course be made of any desired size, so as to measure out any predetermined quantity, and the wheel may readily be removed and another of different capacity substituted.

In the lower part of the case a lamp or other heating means may be placed, the heat from which rises and keeps warm the peanuts in the hopper 11.

It will of course be understood that I do not confine the use of my invention to the vending of peanuts; but any commodity suited for the purpose may be vended by the machine.

Having thus described my invention, what I claim as new, and desire to secure by Letters Patent, is as follows:

1. In a vending-machine, the combination with a receptacle for the commodity to be vended, and devices adapted to transfer a portion of such commodity to a bag or similar receptacle, comprising a revolving device; of means adapted to hold said bag, means adapted to open said bag, and means adapted to free said bag from its supporting means.

2. In a vending-machine, the combination with a receptacle for the commodity to be vended, and devices adapted to transfer a portion of such commodity to a bag or similar receptacle, comprising a shaft having rigidly borne thereon a wheel provided with measuring-compartments, a ratchet-wheel operatively connected with said shaft and wheel, an arm loose on said shaft bearing a pawl adapted to engage with said ratchet-wheel, a lever adapted to operate said arm and pawl, a cam-wheel adapted to operate said lever, and means for revolving said cam-wheel; of means adapted to hold said bag, means adapted to open said bag, and means adapted to free said bag from its supporting means.

3. In a vending-machine, the combination with a receptacle for the commodity to be vended, and devices adapted to transfer a portion of such commodity to a bag or similar receptacle; of means adapted to hold said bag, and means adapted to open said bag and to afterward free same from its support, comprising fingers and means for depressing same and means for moving same forward.

4. In a vending-machine, the combination with a receptacle for the commodity to be vended, and devices adapted to transfer a portion of such commodity to a bag or similar receptacle; of means adapted to hold a plurality of said bags and to push the same forward, and means adapted to open said bag and afterward free same from its support, comprising fingers and means for depressing same and moving same forward.

5. In a vending-machine, the combination with a receptacle for the commodity to be vended, and devices adapted to transfer a portion of such commodity to a bag or similar receptacle; of means adapted to hold said bag, and means adapted to open said bag and to afterward free same from its support, comprising vertically-movable fingers, a lever adapted to raise said fingers and allow same to descend, means for operating said lever, a horizontally-movable support for said fingers and means for moving said support forward.

6. In a vending-machine, the combination with a receptacle for the commodity to be vended, and devices adapted to transfer a portion of such commodity to a bag or similar receptacle; of rods 55 adapted to hold said bag, means adapted to open said bag and afterward free same from its support, comprising vertically-movable fingers 51, a sliding piece 45 supporting same, a lever 52 operating said fingers vertically, an arm or crank 33 operating said lever, a shaft 28, a cam-wheel 31 engagaing with and operating said sliding piece 45, and means for revolving said cam-wheel 31.

7. A vending-machine, comprising a receptacle 11 for the commodity to be vended, a shaft 15 having rigidly borne thereon a wheel 12 provided with measuring-compartments, a ratchet-wheel 17 operatively connected with said shaft and wheel, an arm 18 loose on said shaft and bearing a pawl 19, a lever 22 adapted to operate said arm 18 and pawl 19, a cam-wheel 27 adapted to operate said lever 22, a gear-wheel 34, a shaft 28, a cam-wheel 31, a sliding piece 45, rods 43 supporting same, fingers 51, a rod 50, a vertically-movable rod 48, a lever 52 controlling said rod 48, an arm 33 on the shaft 28 controlling said lever 52, a shaft 36, a gear-wheel 35 on said shaft gearing with the gear-wheel 34, and means for revolving said shaft 36.

8. A vending-machine, comprising a receptacle 11 for the commodity to be vended, a shaft 15 having rigidly borne thereon a wheel 12 provided with measuring-compartments, a ratchet-wheel 17 operatively connected with said shaft and wheel, an arm 18 loose on said shaft and bearing a pawl 19, a lever 22 adapted to operate said arm 18 and pawl 19, a cam-wheel 27 adapted to operate said lever 22 operated by said cam, a shaft 28, a gear-wheel 34 on said shaft, a cam-wheel 31 also on said shaft, a sliding piece 45 operated by said cam-wheel 31, rods 43 supporting said sliding piece, rods 48 and 50 and fingers 51 borne by said sliding piece, a lever 52 controlling said rod 48, an arm 33 on the shaft 28 controlling said lever 52, a shaft 36, a gear-wheel 35 on said shaft gearing with the gear-wheel 34, and means for revolving said shaft 36, comprising a ratchet-wheel 39 fast on said shaft 36, a disk 38 loose on said shaft 36, bearing a pawl 39, an arm or lever 40, and a weight 41 on the end of the said lever 40.

In witness whereof I have hereunto signed my name, this 7th day of January, 1903, in the presence of two subscribing witnesses.

FRANK C. HUTCHINSON.

Witnesses:
   EDMOND CONGAR BROWN,
   PETER A. ROSS.